United States Patent
Richard et al.

(10) Patent No.: US 8,611,022 B2
(45) Date of Patent: Dec. 17, 2013

(54) OPTICAL RECEIVER LENS AND OPTICAL DISTANCE MEASURING DEVICE

(75) Inventors: Matthieu Richard, Remoray (FR); Cedric Pahud, Morges (CH); Bjoern Haase, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 108 days.

(21) Appl. No.: 13/140,420

(22) PCT Filed: Oct. 20, 2009

(86) PCT No.: PCT/EP2009/063699
§ 371 (c)(1), (2), (4) Date: Sep. 30, 2011

(87) PCT Pub. No.: WO2010/069633
PCT Pub. Date: Jun. 24, 2010

(65) Prior Publication Data
US 2012/0013918 A1 Jan. 19, 2012

(30) Foreign Application Priority Data
Dec. 17, 2008 (DE) .................. 10 2008 054 790

(51) Int. Cl.
*G02B 6/32* (2006.01)
*G02B 13/18* (2006.01)

(52) U.S. Cl.
USPC ........................ 359/708; 359/641; 385/33

(58) Field of Classification Search
USPC .......... 359/708, 490, 491, 641; 351/163, 169, 351/159.42; 385/22, 33, 39
See application file for complete search history.

(56) References Cited

U.S. PATENT DOCUMENTS

| 4,418,992 | A | * | 12/1983 | Davenport et al. | ...... 351/159.42 |
| 4,838,675 | A | * | 6/1989 | Barkan et al. | ............ 351/159.42 |
| 5,691,798 | A | * | 11/1997 | Smith | ...................... 351/159.42 |
| 6,626,542 | B2 | * | 9/2003 | Baba et al. | ..................... 353/98 |
| 7,668,421 | B2 | * | 2/2010 | Nagai et al. | ..................... 385/33 |

(Continued)

FOREIGN PATENT DOCUMENTS

| CN | 1677126 A | 10/2005 |
| CN | 2811945 Y | 8/2006 |

(Continued)

OTHER PUBLICATIONS

International Search Report corresponding to PCT Application No. PCT/EP2009/063699, mailed Jan. 14, 2010 (German and English language document) (5 pages).

*Primary Examiner* — Sang Nguyen
(74) *Attorney, Agent, or Firm* — Maginot, Moore & Beck

(57) ABSTRACT

An optical receiver lens has a three-dimensional lens surface, for receiving the laser radiation of a laser distance measuring device, said laser radiation being reflected at an object, wherein the receiver lens can be described in a three-dimensional coordinate system having three axes x, y, z arranged at right angles with respect to one another and wherein the z-axis coincides with the optical axis of the receiver lens. At least one non-spherical area section of the lens surface can be described by addition of a first area, the flexure of which along the z-axis is a first function ($f_1$) of x and y, in particular of (I) and a second area, the flexure of which along the z-axis is a second function ($f_2$) of x and not of y. A distance measuring device is also described.

9 Claims, 3 Drawing Sheets

(56) References Cited

U.S. PATENT DOCUMENTS

2001/0028436 A1* 10/2001 Evans et al. .................. 351/163
2001/0053489 A1* 12/2001 Dirksen et al. ................ 430/30
2007/0030474 A1    2/2007 Yang

FOREIGN PATENT DOCUMENTS

| CN | 101263401 A | 9/2008 |
|---|---|---|
| DE | 43 16 348 | 11/1994 |
| DE | 198 04 059 | 8/1999 |
| DE | 10 2005 007 945 | 8/2006 |
| DE | 20 2006 012 038 U1 | 12/2006 |
| DE | 10 2005 043 418 | 3/2007 |
| DE | 100 51 302 C5 | 12/2007 |
| EP | 0 701 702 B1 | 2/1997 |
| WO | 03/002939 | 1/2003 |
| WO | 2005/064359 | 7/2005 |
| WO | 2006/024566 | 3/2006 |

* cited by examiner

OPTICAL RECEIVER LENS AND OPTICAL DISTANCE MEASURING DEVICE

This application is a 35 U.S.C. §371 National Stage Application of PCT/EP2009/063699, filed Oct. 20, 2009, which claims the benefit of priority to Application Serial No. DE 10 2008 054 790.5, filed Dec. 17, 2008 in Germany, the disclosures of which are incorporated herein by reference in their entirety.

BACKGROUND

The disclosure relates to an optical receiver lens having a three-dimensional lens surface, and to an optical distance measuring device, in particular a laser distance measuring device.

Various types of optical distance measuring devices are described in US 2007/0030474 A1, WO 03/002939 A1, DE 10 051 302 C5, WO 2005/064359 A1, EP 00 701 702 B, WO 2006/024566 A1, and DE 43 16 348 A1.

Difficulties in the design of receiver optics for distance measuring devices stem from the stipulation that the distance measuring devices be capable of use for precise measurement both in the near range and in the far range. Problems in the measurement of large distances arise from extraneous light influences that have a negative effect on the signal-to-noise ratio. In order to reduce the extraneous light influence, the size of the photodetector that is used is usually tuned as well as possible to the size of the light point reflected by distant objects. With near field measurements, there is, inter alia, the problem that a parallax angle between an emitted light beam and a received light beam has a comparably strong effect on the measurement result. The parallax angle is to be ascribed to the fact that the transmitting lens system is arranged next to the receiver lens system. A further, important problem in the design of distance measuring devices that are intended to be used both for the near range and for the far range consists in that the received optical power is proportional to the inverse distance squared in the case of large distances. This results in the necessity to design the receiving system for processing weak signals. The sharp increase in the received laser power in the case of short distances lead, however, at the same time to the fact that the receiving system must be designed to be comparably inefficient for short distances in order to prevent saturation of the electronic detection circuitry.

SUMMARY

It is the object of the disclosure to propose a receiver lens that is suitable for use in measuring both in the near range and in the far range. Furthermore, the object consists in providing an optical distance measuring device with a correspondingly improved optical receiver lens.

This object is achieved by the features set forth herein with regard to the optical receiver lens, and by the features set forth herein with regard to the optical distance measuring device. Advantageous developments of the disclosure are also specified herein. All combinations of at least two of the features disclosed in the description, the claims and/or the figures fall within the scope of the disclosure.

The disclosure is based on the idea of designing at least one aspheric surface section of the lens surface, preferably an aspheric surface section of a lens surface facing the reflecting object, in such a way that it is obtained by an addition of at least two, preferably of exclusively two, surfaces, specifically of a first surface whose sag along the z-axis, that is to say whose extent along the z-axis, is a function both of x and y, in particular the radius ($r^2=x^2+y^2$), and of a second surface whose sag along the z-axis is exclusively a function of x, that is to say not of y. It is particularly preferred for the aspheric surface section to be designed in this case in such a way that the ratio between the optical power received by the optical receiver lens and the optical power detected by a photodetector rises with increasing distance until a constant ratio of preferably more than 90% is reached. The result of this is that the optical power on the photodetector, that is to say the detector circuitry, is not saturated even in the near range and decreases toward smaller distances. A distance measuring device equipped with an optical receiver lens designed using the concept of the disclosure is distinguished by an optimized signal-to-noise ratio. The receiver lens is further distinguished by the possibility of being used for measurements in the near range and in the far range. In particular, a good, stable signal amplitude can be obtained without further outlay even for short distance measurements. Moreover, it is possible for the receiver lens to be formed cost-effectively of plastic. Furthermore, a preferably implemented parallax angle between a receiver beam path and a transmit beam path has only an unimportant effect on the measurement result.

In a development of the disclosure, it is advantageously provided that the first function describing the sag of the first surface along the z-axis, and/or the second function describing the sag of the second surface along the z-axis are/is at least once continuously differentiable. The lens surface can be produced more simply as a result. It is particularly advantageous when the functions describing the sag are at least twice continuously differentiable.

It is advantageously provided in the development of the disclosure that in addition to the first and the second functions for describing the aspheric surface section or a surface subsection of the aspheric surface section it is possible to add at least a third surface whose sag along the z-axis can be described by a third function, for example by a function dependent on x and y, such as, for example:

$$sag(x, y) = \frac{f(x) \cdot y^2}{1 + \sqrt{1 - f(x)^2 \cdot y^2}}$$

It is very particularly preferred when the aspheric surface section, formed as previously described, of the lens surface is arranged on a receiver lens side facing the reflecting object.

The disclosure also leads to an optical distance measuring device, in particular a laser distance measuring device, having an optical receiver lens formed as previously described. The optical distance measuring device can be designed to operate in a way known per se on the basis of interferometric measurements, and/or on the basis of flight time measurements.

Preference is given to an embodiment of the distance measuring device in the case of which the optical receiver lens is the sole receiver lens in the receiving beam path. It is very particularly preferred not to provide any further optical elements, such as mirrors, etc., in addition to the sole receiver lens.

Particular preference is given to an embodiment of the distance measuring device in the case of which the receiving beam path is arranged at a parallax angle to a transmit beam path, the transmit beam path being, with very particular preference, intersected at right angles by the x-axis of the three-dimensional coordinate system describing the receiving lens.

BRIEF DESCRIPTION OF THE DRAWINGS

Further advantages, features and details of the disclosure emerge from the following description of preferred exemplary embodiments, and with the aid of the drawings, in which.

DETAILED DESCRIPTION

Figure 1:
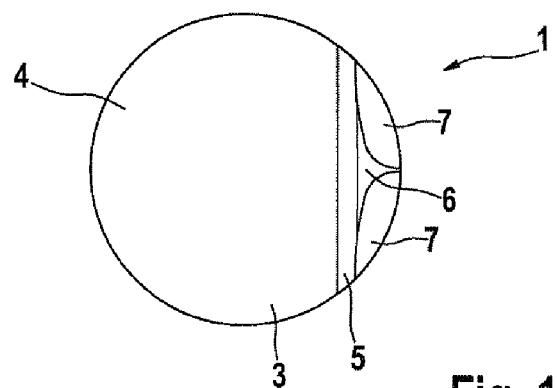
FIG. 1 shows a plan view of a three-dimensional lens surface, facing a reflective object (not shown), of an optical receiver lens.

FIG. 1 shows an optical receiver lens 1 for a distance measuring device 2 illustrated in FIG. 2 and designed as a laser distance measuring device. A three-dimensional lens surface 3 facing the reflecting object (not shown), whose distance can be determined by means of the distance measuring device 2 comprises a spherical section 4 on the left in the plane of the drawing, an adjacent aspheric surface section 5, to the right thereof in the planes of the drawing, for medium distances, and an aspheric surface section 6, adjacent in turn to the latter surface section 5, for short distances. The surface sections marked with the reference numeral 7 do not have a receiving function.

Figure 2A:
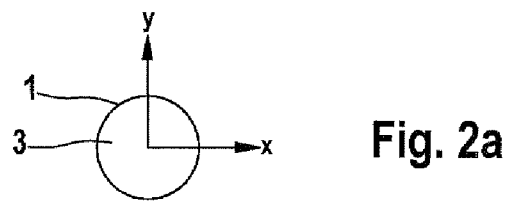
FIG. 2*a* and FIG. 2*b* show two views, rotated by 90°, of an optical receiver lens, the position of a three-dimensional coordinate system with the axes x, y and z being clear from the views.
Figure 2B:
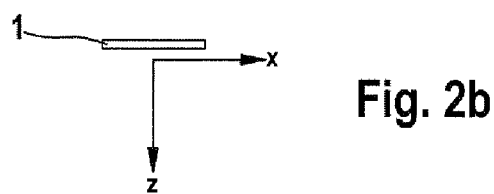

FIGS. 2*a* and 2*b* illustrate the position of a receiver lens 1 in a three-dimensional coordinate system comprising the three axes (x, y, z) running at right angles to one another. It is to be assumed that the x-axis and the y-axis characterize the surface extent of the lens surface 3, whereas the z-axis, which is at right angles to the surface extent of the lens surface, coincides with the optical axis of the receiver lens 1.

Figure 3:
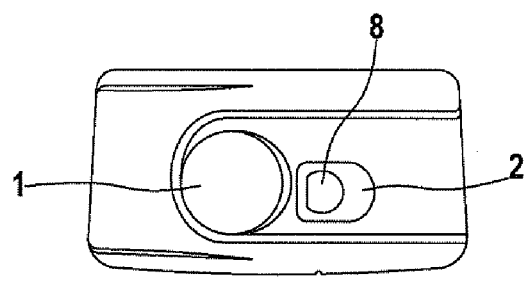
FIG. 3 shows a possible arrangement of an optical receiver lens in a distance measuring device.

A possible arrangement of the receiver lens 1, which is preferably formed from plastic, in a distance measuring device 2 emerges from FIG. 3. It is to be seen that the receiver lens 1 is arranged on the left next to a lens 8 of a transmit beam path, and this leads to a parallax angle (not illustrated) known per se between the transmit beam path and a receiving beam path radiating through the receiver lens 1.

Figure 4A:
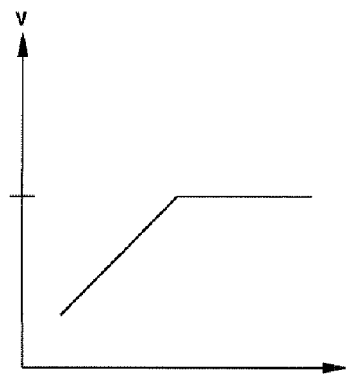
FIG. 4*a* shows a diagram in which the ratio of the optical power received by the optical receiver lens to the optical power detected by a photodetector is plotted against the distance to be measured.
Figure 4B:
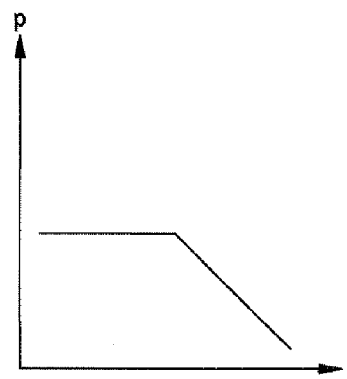
FIG. 4*b* shows a further diagram, which shows the optical power striking the photodetector plotted against the distance to be measured.

FIG. 4*a* shows a diagram in which a ratio value v, formed from an optical power received by the receiver lens 1, and an optical power received by a photodetector, is plotted logarhythmically on the ordinate, and in which the distance is plotted logarhythmically on the abscissa. It is to be seen that the ratio value V in the logarhythmic representation rises linearly with the gradient 2, ideally as far as 100% (in practice, less than 100%, but greater than 90%) and then remains constant. As is to be gathered from the diagram in accordance with FIG. 4*b*, the result of this is that the optical power P of the photodetector is constant at first, that is to say in the near range, and decreases starting from a specific distance value. The diagram in accordance with FIG. 4*b* also uses logarhythmic coordinate axes.

It is to be noted in general that the sag along the z-axis in the case of a receiver lens designed according to the concept of the disclosure can be determined by the addition of a first function $f_1(x+y)$ and of a second function $f_2(x)$. That is to say, as a sum of a first function which is dependent on $\sqrt{x^2+y^2}$ and a second function which is dependent exclusively on x and not on y.

Figure 5:
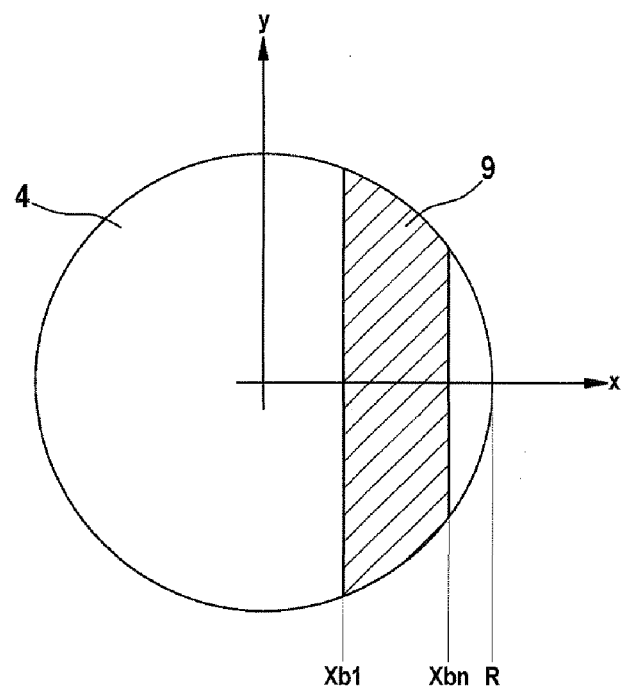
FIG. 5 shows an optical lens having an aspheric surface section.
Figure 6:
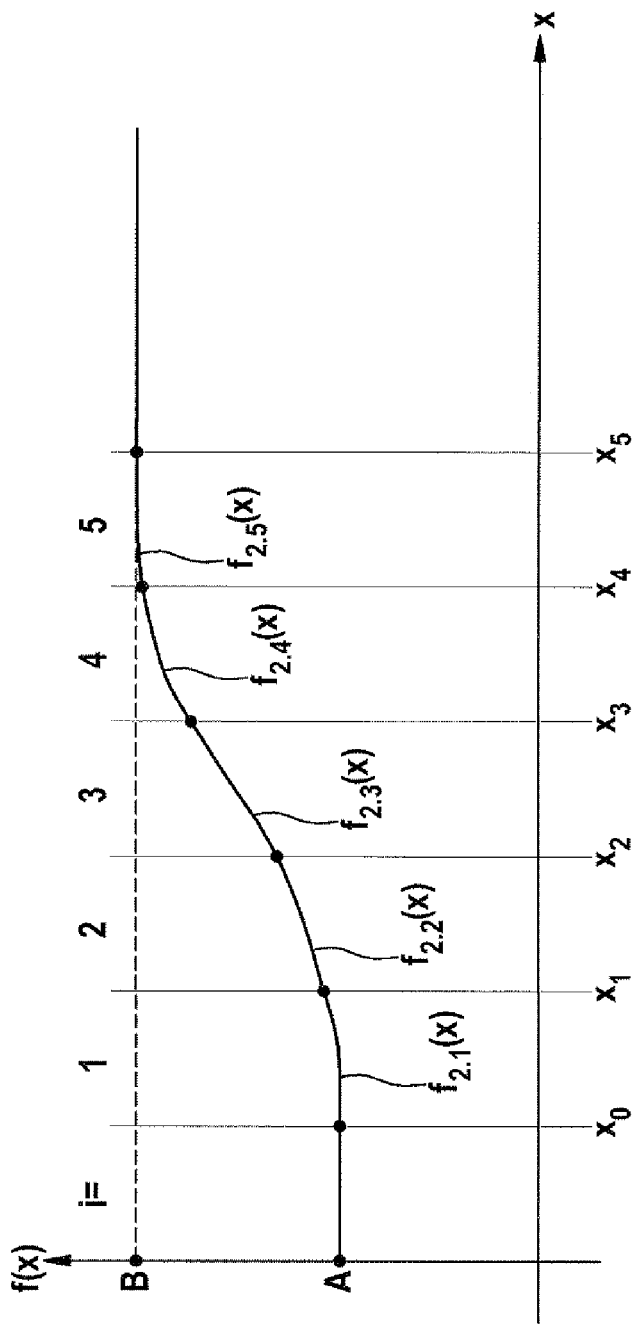
FIG. 6 shows a description of a second function, dependent exclusively on x, by the piecewise linked second order polynomials.

An example of a first and a second function is explained below by means of FIGS. 5 and 6. The sag of the aspheric surface section, shown in FIG. 5 with the reference numeral 9, along the z-axis is described by adding these functions $f_1$, $f_2$. A spherical surface section 4 for the far range is located on the left next to the aspheric surface section 9 in the plane of the drawing.

In accordance with a preferred embodiment, the first function is $$z_1 = f_1(x, y) = d - \frac{r^2}{R_0 \cdot \left(1 + \sqrt{1 - e \cdot \frac{r^2}{R_0^2}}\right)}.$$

The variable $r^2$ (r=radius) can be substituted by $x^2+y^2$.

In the first function $f_1$:

d: is a lens thickness parameter, $R_0$ is a spherical parameter of the base curvature radius of the lens surface, e is a conic parameter, and $z_1$ is the sag of the first surface along the distance from the vertex of the lens in the x-y plane.

The second function $f_2$ is:

$$z_2 = f_2(x)$$

the second function $f_2(x)$ can, for example, be defined by N piecewise linked functions:

$$f_2(x) \equiv \begin{matrix} f_{2,1}(x) & \forall x \in [x_0 K \quad x_1] \\ M \\ f_{2,N}(x) & \forall x \in [x_{N-1} K \quad x_N], \end{matrix}$$

the piecewise defined function sections $f_{2,i}$ being given by second order polynomials:

$$f_{2,i}(x) \equiv a_{i,0} + a_{i,1} \cdot x + a_{i,2} \cdot x^2.$$

The requirement that the function $f_2(x)$ compiled in this way be at least once continuously differentiable leads to the following 2(N+1) conditions:

$$f_{2,1}(x_0) \equiv A$$

$$f_{2,i}(x_i) \equiv f_{2,i+1}(x_i) \; \forall i=1 K N-1$$

$$f_{2,N}(x_N) \equiv B$$

$$f'_{2,1}(x_0) \equiv 0$$

$$f'_{2,i}(x_i) \equiv f'_{2,i+1}(x_i) \; \forall i=1 K N-1$$

$$f'_{2,N}(x_N) \equiv 0$$

The remaining N−2 parameters are available as optimization parameters for the lens design.

The sag of the aspheric surface section 9 is thus obtained by the addition of the sags $z_1$ and $z_2$ of the first and second surface:

$$z = z_1 + z_2 = f_1(x, y) + f_2(x) = d - \frac{r^2}{R_0 \cdot \left(1 + \sqrt{1 - e \cdot \frac{r^2}{R_0^2}}\right)}$$

The invention claimed is:

1. An optical receiver lens comprising:
a three-dimensional lens surface on a receiving side of the optical receiving lens for arrangement facing toward a reflecting object and for receiving laser radiation, reflected by the an object emitted by a laser distance measuring device,
wherein the receiver lens is defined in a three-dimensional coordinate system having three axes x, y, z arranged at right angles to one another, and the z-axis coinciding with the optical axis of the receiver lens,
wherein the lens surface includes at least one aspheric surface section,
wherein the at least one aspheric surface section of the lens surface is defined by the addition of a first surface area, whose sag along the z-axis is defined by a first function $f_1$ of x and y, such that $z_1=$ $$f_1(x, y) = d - \frac{r^2}{R_0\left(1 + \sqrt{1 - e\left(\frac{r^2}{R_0^2}\right)}\right)},$$

wherein d is lens thickness, r (radius) is equal to $\sqrt{x^2+y^2}$, $R_0$ is a base curvature radius of the lens surface, e is a conic parameter, and z1 is the sag of the first surface along the distance from a vertex of the lens in the x-y plane, and of a second surface area, whose sag along the z-axis is defined by a second function $f_2$ of x and not of y, such that $z_2=f_2(x)$.

2. The optical receiver lens as claimed in claim 1, wherein at least one of the first and the second function ($f_1$, $f_2$) is at least once continuously differentiable.

3. The optical receiver lens as claimed in claim 1, wherein the aspheric surface section of the lens surface, or a surface subsection of the aspheric surface section is defined by the supplementary addition of a third surface, whose sag along the z-axis is defined by a third function of at least one of x and y.

4. The optical receiver of claim 1, wherein the lens surface includes a spherical surface section in addition to the at least one aspheric surface section.

5. An optical distance measuring device, having an optical receiver lens having a three-dimensional lens surface for arrangement facing toward a reflecting object and for receiving laser radiation reflected from the object, the receiver lens being defined in a three-dimensional coordinate system having three axes x, y, z arranged at right angles to one another, and the z-axis coinciding with the optical axis of the receiver lens,
wherein the lens surface includes at least one aspheric surface section, and
wherein the at least one aspheric surface section of the lens surface is defined by the addition of a first surface, whose sag along the z-axis (z) is defined by a first function $f_1$ of x and y, such that $z_1=$ $$f_1(x, y) = d - \frac{r^2}{R_0\left(1 + \sqrt{1 - e\left(\frac{r^2}{R_0^2}\right)}\right)}$$

wherein d is lens thickness, r (radius) is equal to $\sqrt{x^2+y^2}$, $R_0$ is a base curvature radius of the lens surface, e is a conic parameter, and z1 is the sag of the first surface from a vertex of the lens in the x-y plane, and of a second surface, whose sag along the z-axis is defined by a second function $f_2$ of x and not of y, such that $z_2=f_2(x)$, where $z_2$ is the sag of the second surface from the vertex of the lens in the x-y plane.

6. The optical distance measuring device as claimed in claim 5, wherein the optical receiver lens is one of the single receiver lens and the single optical element in a receiving beam path for receiving the reflected laser radiation.

7. The optical distance measuring device as claimed in claim 5, wherein the receiving beam path is arranged at a parallax angle to a transmit beam path.

8. The optical distance measuring device as claimed in claim 7, wherein the optical receiver lens is arranged in such a way that the transmit beam path is intersected by the x-axis.

9. The optical distance measuring of claim 5, wherein the lens surface includes a spherical surface section in addition to the at least one aspheric surface section.

* * * * *